(12) United States Patent
Wright et al.

(10) Patent No.: US 9,444,836 B2
(45) Date of Patent: *Sep. 13, 2016

(54) MODELING AND OUTLIER DETECTION IN THREAT MANAGEMENT SYSTEM DATA

(71) Applicant: AT&T Intellectual Property I, L.P., Atlanta, GA (US)

(72) Inventors: Jeremy Wright, Berkeley Heights, NJ (US); John Hogoboom, Boonton, NJ (US); Chaim Spielman, Spring Valley, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,670

(22) Filed: Feb. 29, 2016

(65) Prior Publication Data

US 2016/0182552 A1     Jun. 23, 2016

Related U.S. Application Data

(63) Continuation of application No. 14/016,162, filed on Sep. 2, 2013, now Pat. No. 9,276,949, which is a continuation of application No. 13/116,613, filed on May 26, 2011, now Pat. No. 8,528,088.

(51) Int. Cl.
*H04L 29/06* (2006.01)

(52) U.S. Cl.
CPC ....... *H04L 63/1425* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2002/0035683 A1 | 3/2002 | Kaashoek et al. | |
| 2003/0145232 A1 | 7/2003 | Poletto et al. | |
| 2004/0204906 A1 | 10/2004 | Lambert et al. | |
| 2005/0207413 A1 | 9/2005 | Lerner | |
| 2006/0075084 A1* | 4/2006 | Lyon | H04L 29/06027 709/223 |
| 2007/0245420 A1* | 10/2007 | Yong | H04L 12/2602 726/23 |
| 2007/0283436 A1 | 12/2007 | Duffield et al. | |
| 2008/0028467 A1 | 1/2008 | Kommareddy et al. | |
| 2011/0197278 A1* | 8/2011 | Chow | H04L 63/1458 726/24 |

OTHER PUBLICATIONS

Ahsan Abdullah and Amir Hussain, "A New Biclustering Technique Based on Crossing Minimiazation", Nerocomputing, vol. 60 (2006), pp. 1882-1896.
U.S. Office Action dated Nov. 13, 2012 in U.S. Appl. No. 13/116,613.
U.S. Notice of Allowance dated Apr. 25, 2013 in U.S. Appl. No. 13/116,613.

(Continued)

*Primary Examiner* — Hadi Armouche
*Assistant Examiner* — Malcolm Cribbs
(74) *Attorney, Agent, or Firm* — Hartman & Citrin LLC

(57) ABSTRACT

Methods, systems, and computer-readable media for identifying potential threats on a network based on anomalous behavior in communication between endpoints are provided. Traffic data for a network is accumulated over some period of time. The traffic data is grouped by one or more keys, such as source IP address, and sets of metric values are calculated for the keys. A mixture distribution, such as a negative binomial mixture distribution, is fitted to each set of metric values, and outlying metric values are determined based on the mixture distribution(s). A list of outliers is then generated comprising key values having outlying metric values in one or more of the sets of metric values.

20 Claims, 4 Drawing Sheets

(56) References Cited

OTHER PUBLICATIONS

U.S. Office Action dated Jan. 22, 2015 in U.S. Appl. No. 14/016,162.
U.S. Office Action dated Jun. 12, 2015 in U.S. Appl. No. 14/016,162.
U.S. Notice of Allowance dated Oct. 6, 2015 in U.S. Appl. No. 14/016,162.

* cited by examiner

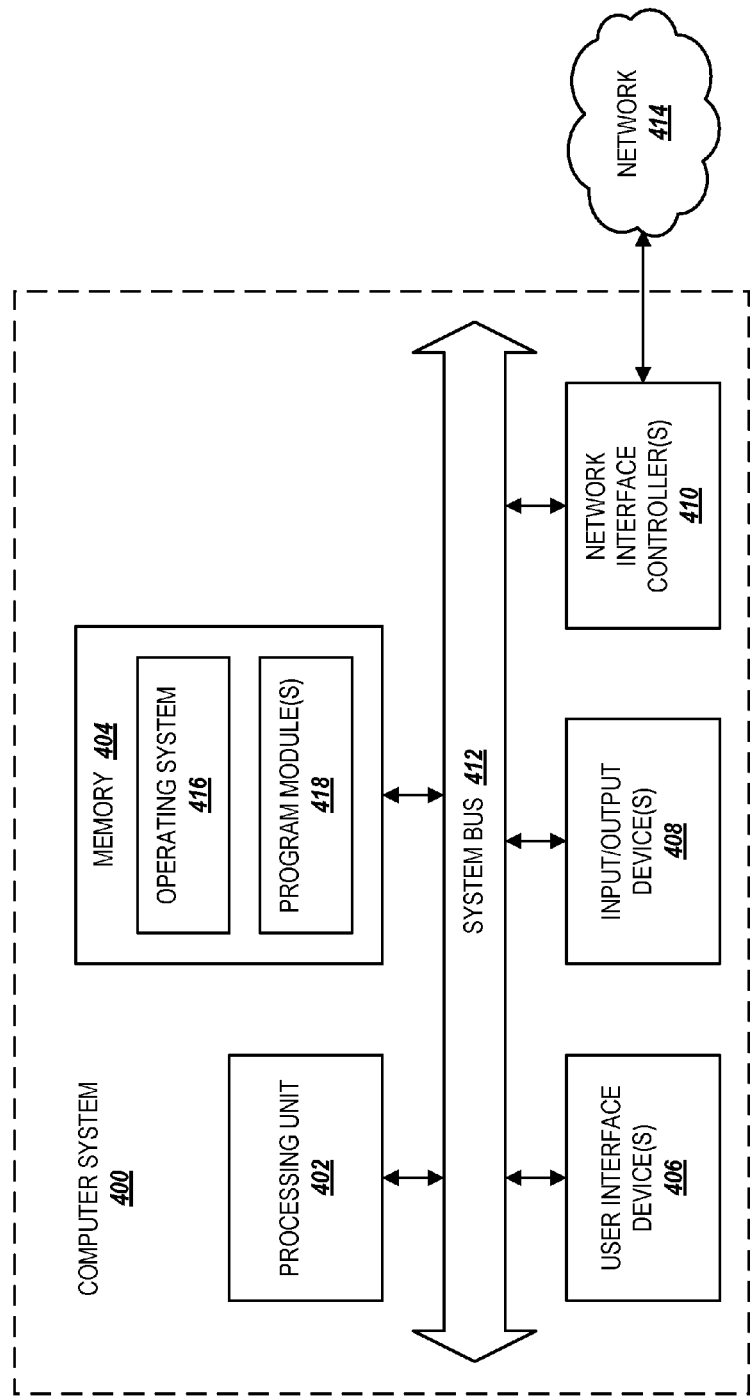

MODELING AND OUTLIER DETECTION IN THREAT MANAGEMENT SYSTEM DATA

CROSS REFERENCE TO RELATED APPLICATION

This application is a continuation of U.S. patent application Ser. No. 14/016,162, entitled "Modeling and Outlier Detection in Threat Management System Data," filed Sep. 2, 2013, now U.S. Pat. No. 9,276,949, which is a continuation of U.S. patent application Ser. No. 13/116,613, entitled "Modeling and Outlier Detection in Threat Management System Data," filed May 26, 2011, now U.S. Pat. No. 8,528,088, which are all expressly incorporated herein by reference in their entireties.

BACKGROUND

This disclosure relates generally to the field of network management and threat management systems. More specifically, the disclosure provided herein relates to strategies for identifying potential threats based on anomalous behaviors of endpoints.

Computers or other endpoints connected to a network, such as a local-area network ("LAN"), a wide-area network ("WAN"), or the Internet, may execute botnets or other malware programs that subject the network to malicious activity, such as sending spam messages, performing denial-of-service attacks, and the like. The botnets or other malware programs may be controlled by one or more centralized server endpoints also attached to the network. Traditional network administration systems may seek to identify and neutralize these threats on the network. For example, a threat management system ("TMS") may be able to identify communication between one or more client endpoints on the network and a known, bad server endpoint, and flag these endpoints for investigation. In another example, the TMS may detect a recognized pattern of communication between endpoints corresponding to a known threat, and flag the endpoints accordingly.

However, these solutions require knowledge of known, bad endpoints and/or command and control structures of potential threats. Because more and more botnets and other malware are introduced to these networks over time, many bad server endpoints may not be known and the command and control structures may be constantly evolving.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for identifying potential threats on a network based on anomalous behavior in communication between endpoints. According to aspects, traffic data for a network is accumulated over some period of time. The traffic data is grouped by one or more keys, and sets of metric values are calculated for the keys. A mixture distribution is fitted to each set of metric values, and outlying metric values are determined based on the mixture distribution(s). A list of outliers is then generated comprising key values having outlying metric values in one or more of the sets of metric values.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 4 is a block diagram showing an illustrative computer hardware and software architecture for a computing system capable of implementing aspects of the embodiments presented herein.

DETAILED DESCRIPTION

Figure 1:
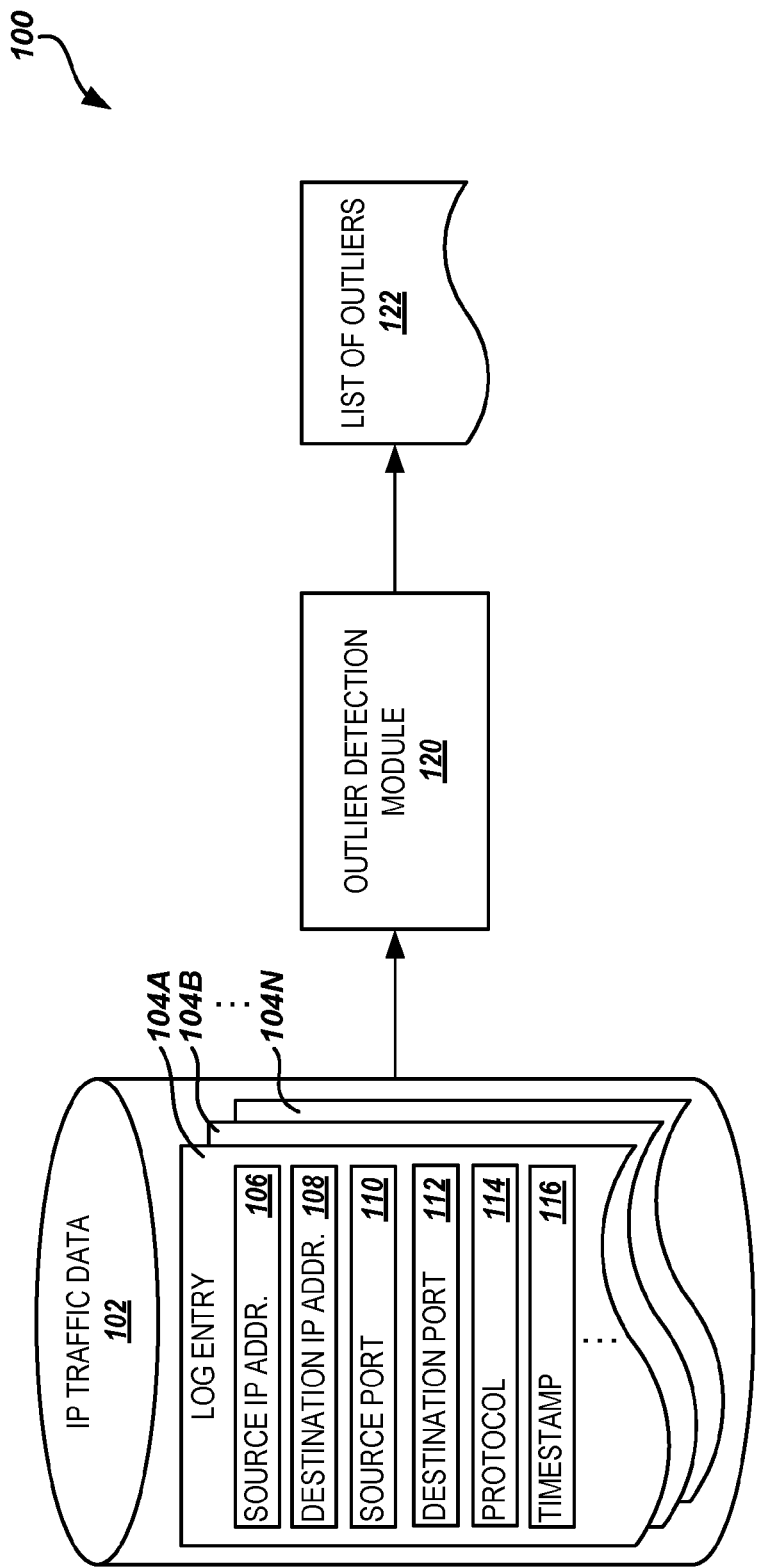
FIG. 1 is a block diagram illustrating an operating environment for identifying potential threats on a network based on anomalous behavior in communication between endpoints, in accordance with exemplary embodiments.

The following detailed description is directed to technologies for identifying potential threats on a network based on anomalous behavior in communication between endpoints. Utilizing the technologies described herein, botnets, 0-day malware, and other potential threats to a network may be identified based on the assumption that endpoints executing the malware will exhibit communications activity and patterns that are different from normal behavior between endpoints on the network, instead of relying on direct knowledge of bad endpoints or existing command and control structures. In addition, those endpoints exhibiting the potentially malicious communications may be grouped or clustered together based on similar behavior patterns, so that if a single malware is identified, all those endpoints grouped with the outlier are also identified as potential threats.

Patterns of behavior may be modeled from log data accumulated from the network and anomalous activity identified that, with further investigation, may reveal the presence of malware on the network. By modeling on multiple fields from the log data, unique characteristics may be identified within the log data that would go undetected by traditional malware detection systems that rely on direct knowledge of bad endpoints or existing command and control structures. In addition, clustering of endpoints exhibiting similar behavior may allow for the creation or methods and procedures that are specific to an identified threat.

The methods, routines, and procedures described herein may be implemented as automatic tools that run efficiently on large volumes of log data, thus reducing the need for an analyst or other network administration personnel to repeatedly spend many hours manually searching for anomalous behavior within large files of log data. The output may comprise key values, such as IP addresses, that identify endpoints that behave anomalously, referred to herein as "outliers," and clusters of keys with similar anomalous profiles. These anomalies may be an indication of the presence of malware on the identified endpoints. Further investigation into these endpoints may lead to remedial action being taken. Where a cluster identifies a set of anomalous endpoints, similar remedial action may be taken on all those endpoints in the set.

Throughout this disclosure, embodiments may be described with respect to IP communications between endpoints on a network. While IP communications provide a useful example for embodiments described herein, it should be understood that the concepts presented herein are equally applicable to any type of communication occurring between endpoints on any type of communications network. Such networks may include, but are not limited to, packet-switched data network, a telephone network, a cellular communications network, a satellite communications network, and the like.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments.

Referring now to FIG. 1, an illustrative operating environment 100 and several software components for generating a list of potential threats from IP traffic data based on anomalous communication behavior between endpoints is shown, according to embodiments. The environment 100 includes Internet Protocol ("IP") traffic data 102. The IP traffic data 102 consists of log entries 104A-104N (referred to herein generally as log entry 104) representing individual IP communications between endpoints attached to a network, such as a LAN, WAN, the Internet, or any combination thereof. Communications between endpoints may be monitored by one or more switches, routers, firewalls, traffic monitors, or other network devices connected to the network and aggregated by a threat management system ("TMS") or other network administration system into the IP traffic data 102. For example, the IP traffic data 102 may contain hundreds of thousands of log entries 104 collected over a several hour period from a network operated by a network service provider. The IP traffic data 102 may be stored in a database to permit statistical computations to be carried out against the data as well as allow other analysis and reporting to be performed.

Each log entry 104 includes a source IP address 106 identifying the source endpoint of the logged IP communication, and a destination IP address 108 identifying the destination endpoint. The log entry 104 may also include a source port 110 and destination port 112 for the IP communication, as well as a protocol 114. The protocol 114 may indicate the transport protocol used for communication between the source and destination endpoints, such as the Transmission Control Protocol ("TCP"), the User Datagram Protocol ("UDP"), and the like. It will be appreciated that each log entry 104 may contain additional data regarding the logged IP communication, including, but not limited to, a timestamp 116 indicating when the transmission took place, a number of packets exchanged between the source endpoint and the destination endpoint in an identified IP flow, and the like.

The environment 100 further includes an outlier detection module 120 which analyzes the IP traffic data 102 to produce a list of outliers 122, as will be described in more detail below in regard to FIGS. 2 and 3. The outlier detection module 120 may be a component of a TMS system or other software application. The outlier detection module 120 may also be a component or add-on to a database analysis program, a spreadsheet program, or other data analysis tool. The outlier detection module 120 may execute on a general purpose computer, such as the computer described below in regard to FIG. 4, or it may be a specialty device located within the network or system from which the IP traffic data 102 was accumulated. The outlier detection module 120 may access the IP traffic data 102 through a database engine.

As described above, the outlier detection module 120 produces a list of potential threats from an analysis of the IP traffic data. According to embodiments, the outlier detection module 120 models normal patterns of IP communication behavior between endpoints reflected in the IP traffic data 102, and then identifies endpoints with IP communications in the IP traffic data that do not fit the modeled behavior, referred to herein as "outliers." These outliers may then be included in a list of outliers 122 and provided to a TMS or other network administration system for alarming or further investigation. In one embodiment, the outlier detection module 120 further develops profiles from the IP traffic data of the outliers and clusters the outliers together based on common behaviors. The clustering may allow better identification of specific threats from among the outliers, such as a specific control and command pattern between a botnet server and one or more botnet clients, for example.

Figure 2:
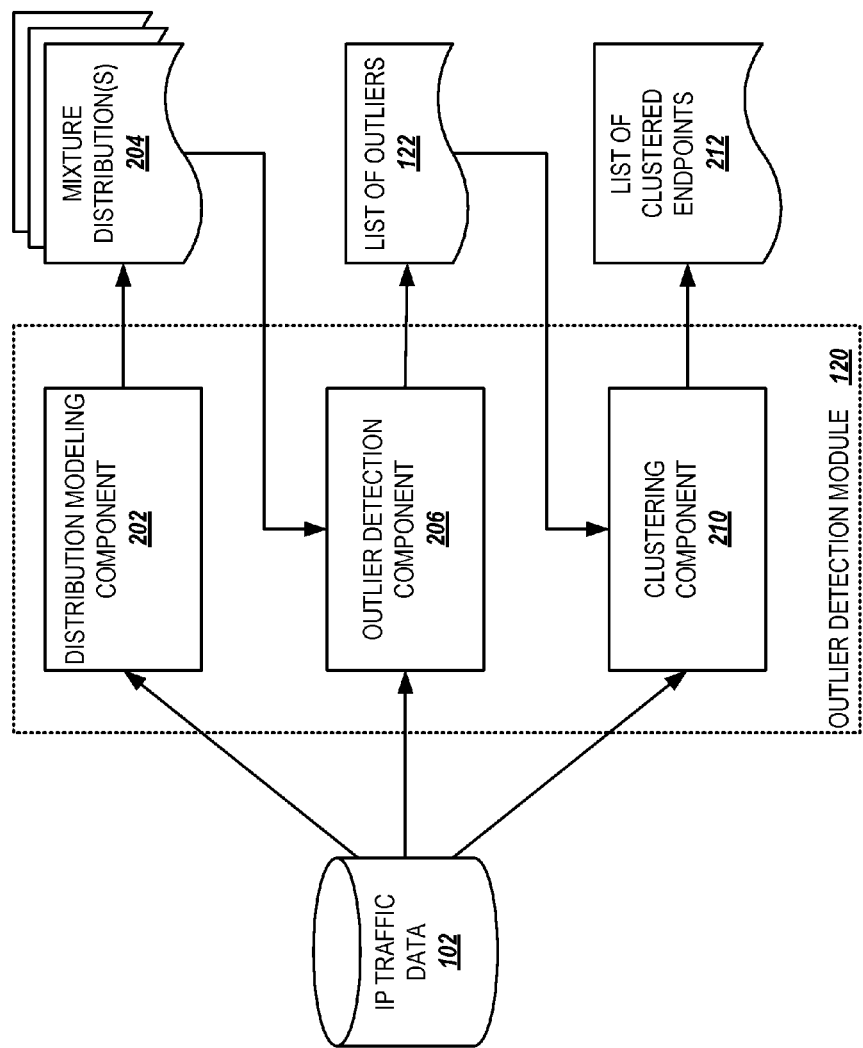
FIG. 2 is a block diagram illustrating additional details regarding an outlier detection module, in accordance with exemplary embodiments.

FIG. 2 provides additional details regarding the operation of the outlier detection module 120 in modeling the communications behavior reflected in the IP traffic data 102 and determining outliers. According to embodiments, the outlier detection module 120 may group the log entries 104 in the IP traffic data 102 according to one or more keys identifying endpoints. A key may comprise a single field from the IP traffic data 102, such as the source IP address 106 or destination IP address 108, or the key may be a combination of fields, such as unique combinations of source and destination IP addresses. The key may contain further fields from the IP traffic data 102 as well, such as the protocol 114. For each key value, the outlier detection module 120 may calculate a number of metrics from the IP traffic data 102. For example, the outlier detection module 120 may calculate one or more of:

for each source IP address 106, the number of log entries 104 in the IP traffic data 102, the number and/or frequency of unique source ports 110 used, the number and/or frequency of unique destination IP addresses 108 and destination port numbers 112, and the like;

for each destination IP address 108, the number of log entries 104, the number and/or frequency of unique destination ports 112, the number and/or frequency of unique source IP addresses 106 and source ports 110, and the like; and/or for each pair of source and destination IP addresses 106, 108, the number of log entries and the like.

For example, for N key values, such as source IP address 106, the outlier detection module 120 may calculate a set of metric values $x_1, \ldots, x_N$ representing the number of log entries 104 in the IP traffic data 102 for the source IP address, and another set of metric values $y_1, \ldots, y_N$ representing the number of distinct IP addresses occurring in the IP traffic for each source IP address, all for a particular protocol 114 and over a specific period of time.

The outlier detection module 120 may then use a distribution modeling component 202 to fit one or more empirical distributions to each set of calculated metrics. According to one embodiment, the distribution modeling component 202 may fit a mixture distribution 204 comprising a number of weighted components to each set of metrics. Utilizing a mixture distribution 204 may allow the multi-modal data, i.e. the different "normal" IP communications between endpoints occurring in the IP traffic data 102, to be accurately modeled. For example, a negative binomial distribution may have two parameters: $\alpha$, $\theta$, and a probability mass function given by:

$$P_{NB}(x \mid \alpha, \theta) = \frac{\Gamma(\alpha + x)}{\Gamma(\alpha) x!} \frac{\theta^x}{(1+\theta)^{\alpha+x}} \text{ for } x = 0, 1, \ldots$$

where $\Gamma(\ )$ is the gamma function. A negative-binomial mixture distribution with K components may be defined by:

$$P_{mix}(x) = \sum_{k=1}^{K} c_k P_{NB}(x \mid \alpha_k, \theta_k) \text{ for } x = 0, 1, \ldots$$

where $c_k$ represents the weight of the $k^{th}$ component, all $c_k$ are greater than zero, and $\Sigma_{k=1}^{K} c_k = 1$.

The optimum number of mixture components may be found using a log-likelihood ratio test, and the Expectation-Maximization ("EM") algorithm, in conjunction with maximum-likelihood estimation, may be used to optimize the weights $c_k$ and parameters of the components of the mixture distribution 204 to fit the set of metrics calculated from the IP traffic data 102. For example, given a set of non-negative metric values $x_1, \ldots, x_N$ calculated for N key values, and given a number of components K, the parameters of a negative-binomial mixture distribution can be optimized to fit the calculated metric values by performing the following steps:

1. Compute membership values:

$$y_{ki} = \frac{c_k P_{NB}(x_i \mid \alpha_k, \theta_k)}{P_{mix}(x_i)} \text{ for } k = 1, \ldots, K, i = 1, \ldots, N$$

2. Re-estimate mixture coefficients:

$$c_k = \frac{1}{N} \sum_{i=1}^{N} y_{ki} \text{ for } k = 1, \ldots, K$$

3. Compute weighted data-points $\{w_{ki}, x_i\}$ for $k=1, \ldots, K$, $i=1, \ldots, N$ where:

$$w_{ki} = \frac{N y_{ki}}{\sum_{j=1}^{N} y_{kj}}$$

4. For each $k=1, \ldots, K$, re-estimate negative binomial parameters $\{\alpha_k, \theta_k\}$ by likelihood maximization, using weighted data-points:
   a. solve the following for $\alpha_k$ using Newton-Raphson iteration, for example:

$$\sum_{i=1}^{N} w_{ki}(\psi(\alpha_k + x_i) - \psi(\alpha_k)) + N \ln \frac{\alpha_k}{\bar{x}_k + \alpha_k} = 0$$

b. set $\theta_k = \bar{x}_k / \alpha_k$
   where $\bar{x}_k = \Sigma_{i=1}^{N} w_{ki} x_i / \Sigma_{i=1}^{N} w_{ki}$ is sample weighted mean, and $\psi(\ )$ is the digamma function, starting from initial estimates of $\{c_k, \alpha_k, \theta_k\}_{k=1, \ldots, K}$, and repeating the steps until the solution converges. According to one embodiment, the solution may be considered to have converged if successive values of $\{c_k, \alpha_k, \theta_k\}_{k=1, \ldots, K}$ differ by no more than 0.1%.

To select a value for the number of components K, the above procedure may be repeated for K=1,2, . . . while evaluating the log-likelihood of the data for each K:

$$L(K) = \sum_{i=1}^{N} \ln(P_{mix}(x_i))$$

For successive values of K, if there is no improvement in the model, then twice the difference in log-likelihood values should have an approximate chi-square distribution with three degrees of freedom:

$$2(L(K) - L(K-1)) \sim \chi_3^2$$

The process can be stopped when increasing the value of K does not significantly improve the likelihood of the data. In the overall iteration for optimizing the mixture distribution parameters $\{c_k, \alpha_k, \theta_k\}_{k=1, \ldots, K}$ to fit the set of metric values calculated from the IP traffic data 102, the solution may be considered to have converged when no parameter differs from its value for the previous iteration by more than 0.1%, for example.

The outlier detection module 120 may then utilize an outlier detection component 206 to identify those key values, such as specific source IP addresses 106, in the IP traffic data 102 having calculated metric values that do not fit the principal components of the corresponding mixture distribution(s) 204 generated for the metric. The mixture distribution described above may provide a natural way to discover these outliers, since the principal components of the mixture cover the bulk of the data (and presumably benign IP communications), while the residual components (if any) cover the anomalous communication behavior patterns. Key values having outlying metric values may identify endpoints involved in traffic that is not benign, especially if the key values are outliers with respect to two or more of the sets of calculated metrics based on their corresponding mixture distributions 204.

According to one embodiment, to identify outliers within a set of calculated metric values $x_1, \ldots, x_N$, using a mixture distribution 204 optimized for those values as described above, a fit quantity $u(x_i)$ may be calculated for each metric value $x_i$, where:

$$u(x_i) = \frac{\sum_{k=1}^{K} c_k P_{NB}(x_i \mid \alpha_k, \theta_k)}{\sum_{k=1}^{K} P_{NB}(x_i \mid \alpha_k, \theta_k)}.$$

It will be appreciated that the fit quantity $u(x_i)$ will be relatively large, i.e. close to 1, if $x_i$ would be generated with high probability by the dominant components of the corresponding mixture distribution 204, i.e. those with relatively large coefficients $c_k$. Conversely, the fit quantity $u(x_i)$ will be relatively small, i.e. close to 0, if $x_i$ is not generated with high probability by the dominant components of the mixture distribution 204, i.e. $x_i$ is an outlier. Each calculated metric value may be given a numerical fit quantity in this way, and those fit quantities below a chosen threshold, e.g. where $u(x_i)<10^{-10}$, may be designated as outliers.

Some metrics may be expected to vary widely, such as the number of distinct destination IP addresses 108, for example. The outlier detection component 206 may utilize the perplexity for $x_i$ to determine the outliers instead of the actual metric value in these cases. Perplexity may be defined as:

$$x_i = \exp(H_i) \text{ where } H_i = -\sum_{j=1}^{n_i} \frac{f_{ij}}{F_i} \ln \frac{f_{ij}}{F_i}$$

and $f_{i1}, \ldots, f_{in_i}$ are the observed frequencies for the $j^{th}$ destination IP address 108 for a particular key (e.g. source IP address 106), with $F_i = \sum_{j=1}^{n_i} f_{ij}$. Utilizing the perplexity value may have the effect of "flattening out" the distribution into an equivalent number of equally-likely cases. The perplexity may be utilized for other metrics, as well, such as the number of distinct source or destination ports 110, 112.

The outlier detection component 206 may produce a list of outliers 122 comprising endpoints having one or more outlying metrics values. The endpoints may be identified in the list of outliers 122 by their key values, such as the source IP address 106, for example. The list of outliers 122 may be provided to other components of the TMS or other network administration system for alarming and/or for presentation to network administration personnel for further investigation. According to one embodiment, the outlier detection component 206 may only include endpoints in the list of outliers 122 having outlying values from two or more of the sets of calculated metrics from the IP traffic data 102, based on their corresponding mixture distributions 204.

According to another embodiment, the outlier detection module 120 may include a clustering component 210 that groups or clusters the endpoints in the list of outliers 122 together based on similar IP communication patterns or behaviors to produce a list of clustered endpoints 212. For example, the clustering component 210 may develop several profiles from the IP traffic data 102 and metric values for the outlying endpoints and assign each endpoint to one or more of the developed profiles. If the IP communication pattern or behavior in a particular profile is determined to be malicious, then all the outlying endpoints assigned to that profile could be investigated or blacklisted together, for example. If the IP communication pattern or behavior in the profile is determined to be benign, then those endpoints assigned to the profile could be filtered out of subsequent analyses, e.g. before the mixture distributions 204 were generated.

In addition, the clustering component 210 may co-cluster outlying endpoints identified from datasets with different keys, such as outlying source IP addresses 106 and outlying destination IP addresses 108, that are linked to form joint clusters. Although the outlying source IP addresses 106 and destination IP addresses 108 could be clustered separately, it may be desirable to co-cluster them because of the known relationship between them represented in the IP traffic data 102. For example, the clustering component 210 may use a procedure similar to that described by Ahsan Abdullah and Amir Hussain, "A New Biclustering Technique Based on Crossing Minimization," Neurocomputing, vol. 69 (2006), pp. 1882-1896, to minimize the number of crossings within a bipartite graph representing the data, with the source IP addresses 106 forming the nodes in one partition, the destination IP addresses 108 forming the nodes in the other, and edges connecting the pairs that inter-communicate based on the log entries 104 in the IP traffic data. This may tend to separate out the joint clusters which can then be extracted and results in joint clusters of source IP addresses 106 and destination IP addresses 108 based on their frequency of inter-communication. In alternative embodiments, the clustering component 210 could utilize machine learning algorithms or dynamic programming algorithms to co-cluster outlier endpoints. It will be appreciated that the clustering component 210 may also consider other conditions for clustering, such as protocol 114.

Figure 3:
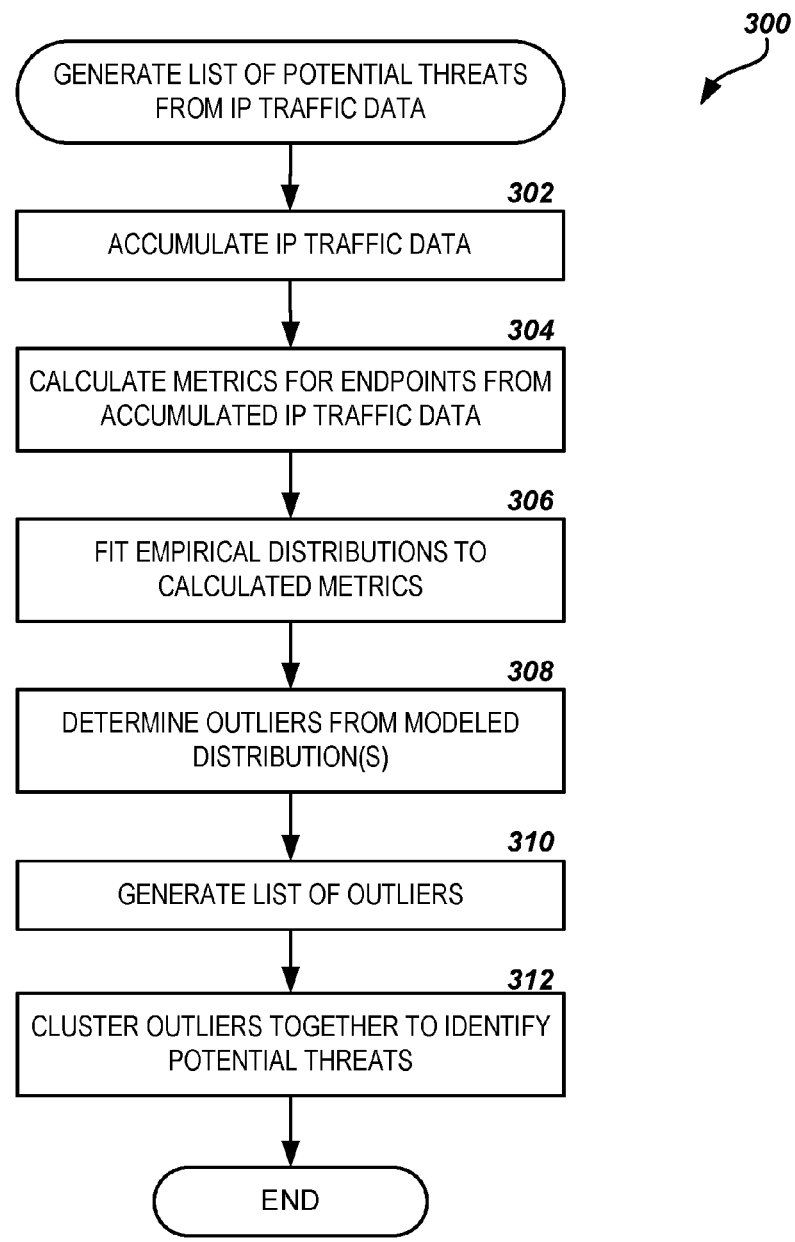
FIG. 3 is a flow diagram illustrating one method for generating a list of potential threats from IP traffic data based on communication behavior of endpoints, in accordance with exemplary embodiments.

Referring now to FIG. 3, additional aspects regarding the operation of the components and software modules described above in regard to FIGS. 1 and 2 will be provided. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

It should also be appreciated that, while the operations are depicted in FIG. 3 as occurring in a sequence, various operations described herein may be performed by different components or modules at different times. In addition, more or fewer operations may be performed than shown, and the operations may be performed in a different order than illustrated in FIG. 3.

FIG. 3 illustrates an exemplary routine 300 for generating a list of potential threats from IP traffic data based on anomalous communication behavior of endpoints and clustering the endpoints based on similar behavior patterns, according to embodiments. The routine 300 begins at operation 302, where IP traffic data 102 is accumulated for some period of time. As described above in regard to FIG. 1, IP communications between endpoints on a network may be logged by one or more switches, routers, firewalls, traffic monitors, or other network devices connected to the network over some period of time, such as several hours or a day. The logged communications may be stored as IP traffic data 102, in a database accessible to the outlier detection module 120 to permit the statistical computations and modeling described herein.

From operation 302, the routine 300 proceeds to operation 304, where the outlier detection module 120 calculates one or more sets of metrics for endpoints from the accumulated IP traffic data 102. As described above in regard to FIG. 2, the outlier detection module 120 may group the log entries 104 in the IP traffic data 102 according to a key comprising one or more fields identifying individual endpoints, such as source IP address 106 or destination IP address 108, or a combination of endpoints, such as unique combinations of source and destination IP addresses. In addition, the outlier detection module 120 may include other fields from the IP traffic data 102 in the key, such as the protocol 114.

For each key value, the outlier detection module 120 calculates metric values for each set of metrics from the IP traffic data 102. For example, the outlier detection module 120 may calculate the number of log entries 104 in the IP traffic data 102 for each source IP address 106, the number of unique source ports 110 used, the number of unique destination IP addresses 108, and the like. Similarly, the outlier detection module 120 may calculate the number of log entries 104 for each destination IP address 108, the number of unique destination ports 112, the number of unique source IP addresses 106, and the like. It will be appreciated that any number of sets of metrics may be calculated from the IP traffic data 102 by the outlier detection module 120 for any number of different keys beyond those described herein.

The routine 300 proceeds from operation 304 to operation 306, where the outlier detection module 120 fits one or more empirical distributions to each set of metrics calculated from the IP traffic data 102 at operation 304. In one embodiment, the outlier detection module 120 utilizes a distribution modeling component 202 to fit a mixture distribution 204 comprising a number of weighted components to each set of metrics, as further described above in regard to FIG. 2. The mixture distribution may comprise a negative-binomial mixture distribution, for example, or the mixture distribution may be any other mixture distribution known in the art.

From operation 306, the routine 300 proceeds to operation 308, where the outlier detection module 120 detects endpoints, identified by the key values, having outlying metric values for one or more of the sets of metrics based on the corresponding mixture distributions 204. Endpoints having outlying metric values may represent endpoints involved in IP communications that are not benign, especially if the endpoint is an outlier with respect to two or more of the sets of calculated metrics and their corresponding mixture distributions 204. In one embodiment, the outlier detection module 120 utilizes an outlier detection component 206 to calculate a fit quantity for each metric value, as described above in regard to FIG. 2. The fit quantity is relatively large if the metric value would be generated with high probability by the dominant components of the corresponding mixture distribution 204, i.e. those covering presumably benign IP communications, and relatively small if the metric value is in the "tail" of the distribution, i.e. generated by residual components of the mixture distribution covering anomalous communication behavior patterns. Those endpoints having a metric value with a fit quantity below a chosen threshold, e.g. less than $10^{-10}$, based on the corresponding mixture distribution 204 may be designated as outliers in regard to that metric. In another embodiment, the outlier detection component 206 may utilize the perplexity calculated for the metric value instead of the actual metric value.

The routine 300 then proceeds from operation 308 to operation 310, where the outlier detection module 120 produces the list of outliers 122 comprising endpoints having one or more outlying metrics values. The endpoints may be identified in the list of outliers 122 by their key values, such as the source IP address 106, for example. The list of outliers 122 may be provided to other components of the TMS or other network administration system for alarming or for presentation to network analysis personnel for further investigation. According to one embodiment, the outlier detection component 206 may only include endpoints on the list of outliers 122 having outlying values from two or more of the calculated metrics in the IP traffic data 102, based on their corresponding mixture distributions 204.

According to one embodiment, the routine proceeds from operation 310 to operation 312, where the outlier detection module 120 clusters the endpoints in the list of outliers 122 together based on similar IP communication patterns or behaviors. The outlier detection module 120 may utilize a clustering component 210 that develops several profiles from the IP traffic data 102 for the outliers and assigns each endpoint to one or more of the developed profiles. If the IP communication pattern or behavior in a particular profile is determined to be malicious, then all the outlying endpoints assigned to that profile could be investigated or blacklisted together, for example. If the IP communication pattern or behavior in the profile is determined to be benign, then those endpoints assigned to the profile could be filtered out of subsequent analysis. In a further embodiment, the clustering component 210 may co-cluster outliers with different keys, such as outlying source IP addresses 106 and outlying destination IP addresses 108, based on the relationship between them represented in the IP traffic data 102. From operation 310, the routine 300 ends.

FIG. 4 is a block diagram illustrating a computer system 400 configured to identify potential threats on a network based on anomalous behavior in communication between endpoints, in accordance with exemplary embodiments. Such a computer system 400 may be utilized to implement the outlier detection module 120 described above in regard to FIG. 1. The computer system 400 includes a processing unit 402, a memory 404, one or more user interface devices 406, one or more input/output ("I/O") devices 408, and one or more network interface controllers 410, each of which is operatively connected to a system bus 412. The bus 412 enables bi-directional communication between the processing unit 402, the memory 404, the user interface devices 406, the I/O devices 408, and the network interface controllers 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include, but are not limited to, WINDOWS®, WINDOWS® CE, and WINDOWS MOBILE® from MICROSOFT CORPORATION, LINUX, SYMBIAN™ from SYMBIAN SOFTWARE LTD., BREW® from QUALCOMM INCORPORATED, MAC OS® from APPLE INC., and FREEBSD operating system. An example of the program modules 418 includes the outlier detection module 120. In one embodiment, the program modules 418 are embodied in computer-readable media containing instructions that, when executed by the processing unit 402, performs the routine 300 for generating a list of potential threats from IP traffic data based on anomalous communication behavior of endpoints and clustering the endpoints based on similar behavior patterns, as described in greater detail above in regard to FIG. 3. According to further embodiments, the program modules 418 may be embodied in hardware, software, firmware, or any combination thereof.

Computer-readable media may comprise communication media and computer storage media. Communication media includes transitory signals. Computer storage media includes volatile and non-volatile, removable and non-removable media implemented in any method or technology for storage of information, such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network interface controllers 410 enable the computer system 400 to communicate with other networks or remote systems via a network 414. Examples of the network interface controllers 410 may include, but are not limited to, a modem, a radio frequency ("RF") or infrared ("IR") transceiver, a telephonic interface, a bridge, a router, or a network card. The network 414 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 414 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method of identifying potential threats on a network, the method comprising:
    monitoring, by a processor of a system comprising the processor and a memory, communications between endpoints on the network;
    aggregating, by the processor of the system, the communications between the endpoints into traffic data, wherein the traffic data comprises a plurality of log entries, and wherein each of the plurality of log entries comprises information identifying a corresponding transport protocol used for each of the communications between the endpoints;
    storing, by the processor of the system, the traffic data;
    grouping, by the processor of the system, the traffic data between the endpoints on the network based on a key value;
    calculating, by the processor of the system, a first set of metric values for the traffic data grouped according to the key value and calculating, by the processor of the system, a second set of metric values for the traffic data grouped according to the key value;
    fitting, by the processor of the system, a first mixture distribution to the first set of metric values and a second mixture distribution to the second set of metric values;
    identifying, by the processor of the system, an endpoint from the endpoints as an outlier, wherein the endpoint identified as the outlier is associated with a metric value from the first set of metric values that does not fit the first mixture distribution and is associated with a metric value from the second set of metric values that does not fit the second mixture distribution; and
    providing, by the processor of the system, the endpoint identified as the outlier to a threat management system to provide an alarm associated with identification of the endpoint as the outlier.

2. The method of claim 1, wherein identifying the endpoint from the endpoints as the outlier comprises identifying a plurality of the endpoints as outliers, and wherein the method further comprises clustering the plurality of the endpoints identified as the outliers based on similar communication behavior patterns exhibited by the plurality of the endpoints.

3. The method of claim 1, wherein the key value comprises a single field from the traffic data.

4. The method of claim 1, wherein the key value comprises a combination of fields from the traffic data.

5. The method of claim 1, wherein the first mixture distribution comprises a negative binomial mixture distribution.

6. The method of claim 1, wherein identifying the endpoint from the endpoints as the outlier comprises:
    calculating fit quantities for the first set of metric values indicating if each of the first set of metric values would be generated by a high probability from dominant components of the first mixture distribution; and
    identifying the metric value from the first set of metric values associated with the endpoint identified as the outlier as having a fit quantity below a specific threshold.

7. The method of claim 1, further comprising calculating a perplexity of the first set of metric values and identifying outliers based on the perplexity of each metric value in the first set of metric values.

8. A system comprising:
    a processor; and
    a memory storing instructions that, when executed by the processor, cause the processor to perform operations comprising
        monitoring communications between endpoints on a network,
        aggregating the communications between the endpoints into traffic data, wherein the traffic data comprises a plurality of log entries, and wherein each of the plurality of log entries comprises information identifying a corresponding transport protocol used for each of the communications between the endpoints, storing the traffic data, grouping the traffic data between the endpoints on the network based on a key value, calculating a first set of metric values for the traffic data grouped according to the key value and calculating a second set of metric values for the traffic data grouped according to the key value, fitting a first mixture distribution to the first set of metric values and a second mixture distribution to the second set of metric values, identifying an endpoint from the endpoints as an outlier, wherein the endpoint identified as the outlier is associated with a metric value from the first set of metric values that does not fit the first mixture distribution and is associated with a metric value from the second set of metric values that does not fit the second mixture distribution, and providing the endpoint identified as the outlier to a threat management system to provide an alarm associated with identification of the endpoint as the outlier.

9. The system of claim 8, wherein identifying the endpoint from the endpoints as the outlier comprises identifying a plurality of the endpoints as outliers, and wherein the operations further comprise clustering the plurality of the endpoints identified as the outliers based on similar communication behavior patterns exhibited by the plurality of the endpoints.

10. The system of claim 8, wherein the key value comprises a single field from the traffic data.

11. The system of claim 8, wherein the key value comprises a combination of fields from the traffic data.

12. The system of claim 8, wherein the first mixture distribution comprises a negative binomial mixture distribution.

13. The system of claim 8, wherein identifying the endpoint from the endpoints as the outlier comprises:

calculating fit quantities for the first set of metric values indicating if each of the first set of metric values would be generated by a high probability from dominant components of the first mixture distribution; and identifying the metric value from the first set of metric values associated with the endpoint identified as the outlier as having a fit quantity below a specific threshold.

14. The system of claim 8, wherein the operations further comprise calculating a perplexity of the first set of metric values and identifying outliers based on the perplexity of each metric value in the first set of metric values.

15. A computer-readable storage device storing instructions that, when executed by a processor of a system, cause the processor to perform operations comprising:

monitoring communications between endpoints on a network;

aggregating the communications between the endpoints into traffic data, wherein the traffic data comprises a plurality of log entries, and wherein each of the plurality of log entries comprises information identifying a corresponding transport protocol used for each of the communications between the endpoints;

storing the traffic data;

grouping the traffic data between the endpoints on the network based on a key value;

calculating a first set of metric values for the traffic data grouped according to the key value and calculating a second set of metric values for the traffic data grouped according to the key value;

fitting a first mixture distribution to the first set of metric values and a second mixture distribution to the second set of metric values;

identifying an endpoint from the endpoints as an outlier, wherein the endpoint identified as the outlier is associated with a metric value from the first set of metric values that does not fit the first mixture distribution and is associated with a metric value from the second set of metric values that does not fit the second mixture distribution; and providing the endpoint identified as the outlier to a threat management system to provide an alarm associated with identification of the endpoint as the outlier.

16. The computer-readable storage device of claim 15, wherein identifying the endpoint from the endpoints as the outlier comprises identifying a plurality of the endpoints as outliers, and wherein the operations further comprise clustering the plurality of the endpoints identified as the outliers based on similar communication behavior patterns exhibited by the plurality of the endpoints.

17. The computer-readable storage device of claim 15, wherein the key value comprises a single field from the traffic data.

18. The computer-readable storage device of claim 15, wherein the key value comprises a combination of fields from the traffic data.

19. The computer-readable storage device of claim 15, wherein identifying the endpoint from the endpoints as the outlier comprises:

calculating fit quantities for the first set of metric values indicating if each of the first set of metric values would be generated by a high probability from dominant components of the first mixture distribution; and identifying the metric value from the first set of metric values associated with the endpoint identified as the outlier as having a fit quantity below a specific threshold.

20. The computer-readable storage device of claim 15, wherein the operations further comprise calculating a perplexity of the first set of metric values and identifying outliers based on the perplexity of each metric value in the first set of metric values.

* * * * *